United States Patent
Ishikawa et al.

(10) Patent No.: US 12,344,733 B2
(45) Date of Patent: Jul. 1, 2025

(54) THERMOPLASTIC ELASTOMER COMPOSITION AND THERMOPLASTIC ELASTOMER MOLDED BODY

(71) Applicant: MITSUI CHEMICALS, INC., Tokyo (JP)

(72) Inventors: Ryo Ishikawa, Ichihara (JP); Ryosuke Aburaki, Ichihara (JP); Remi Kusumoto, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 660 days.

(21) Appl. No.: 17/615,658

(22) PCT Filed: Jun. 17, 2020

(86) PCT No.: PCT/JP2020/023719
§ 371 (c)(1),
(2) Date: Dec. 1, 2021

(87) PCT Pub. No.: WO2020/256000
PCT Pub. Date: Dec. 24, 2020

(65) Prior Publication Data
US 2022/0315748 A1    Oct. 6, 2022

(30) Foreign Application Priority Data
Jun. 21, 2019   (JP) .................................. 2019-115407

(51) Int. Cl.
*C08L 23/16* (2006.01)
*B29C 45/00* (2006.01)
(Continued)

(52) U.S. Cl.
CPC .......... *C08L 23/16* (2013.01); *B29C 45/0001* (2013.01); *C08L 53/00* (2013.01); *B29K 2023/16* (2013.01)

(58) Field of Classification Search
CPC ...... C08L 23/16; C08L 53/00; C08L 2207/04; C08L 23/0815; C08L 23/083;
(Continued)

(56) References Cited

U.S. PATENT DOCUMENTS

| 6,476,139 B2 | 11/2002 | Akaike et al. |
| 7,754,815 B2 | 7/2010 | Toyoda et al. |

(Continued)

FOREIGN PATENT DOCUMENTS

| CN | 101248136 A | 8/2008 |
| CN | 101754996 A | 6/2010 |

(Continued)

OTHER PUBLICATIONS

Translation of JP 2002-206034 (Year: 2002).*

*Primary Examiner* — Robert C Boyle
(74) *Attorney, Agent, or Firm* — Foley & Lardner LLP

(57) ABSTRACT

A thermoplastic elastomer composition: 41 to 70 parts by mass of component (A), 0 to 54 parts by mass of component (B), and 5 to 59 parts by mass of component (C) ((A), (B), and (C) being 100 parts by mass), with dynamic heat treatment with a cross-linking agent. Component (A): a propylene block copolymer having a melt flow rate measured in accordance with ISO 1133. Component (B): an ethylene/α-olefin/non-conjugated polyene copolymer including a structural unit derived from ethylene, a structural unit derived from an α-olefin having 3 to 20 carbon atoms, and a structural unit derived from a non-conjugated polyene. Component (C): an ethylene/α-olefin copolymer including a structural unit derived from ethylene and a structural unit derived from an α-olefin having 4 to 20 carbon atoms and having a melt flow rate measured in accordance with ISO 1133.

8 Claims, 1 Drawing Sheet

(51) Int. Cl.
*C08L 53/00* (2006.01)
*B29K 23/00* (2006.01)

(58) Field of Classification Search
CPC .... B29C 45/0001; B29K 2023/16; C08J 5/00; C08J 2353/00; C08J 2423/08
See application file for complete search history.

(56) References Cited

U.S. PATENT DOCUMENTS

| | | | |
|---|---|---|---|
| 7,772,319 | B2 | 8/2010 | Fujihara et al. |
| 8,722,799 | B2 | 5/2014 | Eguchi et al. |
| 9,694,522 | B2 | 7/2017 | Ohtani et al. |
| 10,253,172 | B2 | 4/2019 | Ohtani |
| 10,280,293 | B2 | 5/2019 | Kurita et al. |
| 11,407,885 | B2 | 8/2022 | Sasaki et al. |
| 2001/0028932 | A1* | 10/2001 | Akaike .................. C08L 53/02 428/131 |
| 2006/0199909 | A1 | 9/2006 | Toyoda et al. |
| 2009/0105396 | A1 | 4/2009 | Fujihara et al. |
| 2010/0207365 | A1 | 8/2010 | Ohtani et al. |
| 2011/0281994 | A1 | 11/2011 | Eguchi et al. |
| 2012/0259057 | A1 | 10/2012 | Ohtani |
| 2013/0005883 | A1 | 1/2013 | Nakahama et al. |
| 2018/0086904 | A1* | 3/2018 | Kurita .................. C08L 23/10 |
| 2020/0024435 | A1 | 1/2020 | Sasaki et al. |

FOREIGN PATENT DOCUMENTS

| | | |
|---|---|---|
| CN | 102766298 A | 11/2012 |
| CN | 102870227 A | 1/2013 |
| CN | 102893412 A | 1/2013 |
| JP | H09-137001 A | 5/1997 |
| JP | 2001-279030 A | 10/2001 |
| JP | 2002-146131 A | 5/2002 |
| JP | 2002-206034 * | 7/2002 |
| JP | 2006-282992 A | 10/2006 |
| JP | 2012-224837 A | 11/2012 |
| JP | 2016-186040 A | 10/2016 |
| JP | 2016-186041 A | 10/2016 |
| JP | 2018-044085 A | 3/2018 |
| WO | WO-2010/067564 A1 | 6/2010 |
| WO | WO-2016/152710 A1 | 9/2016 |
| WO | WO-2018/180371 A1 | 10/2018 |
| WO | WO-2020/162382 A1 | 8/2020 |

* cited by examiner

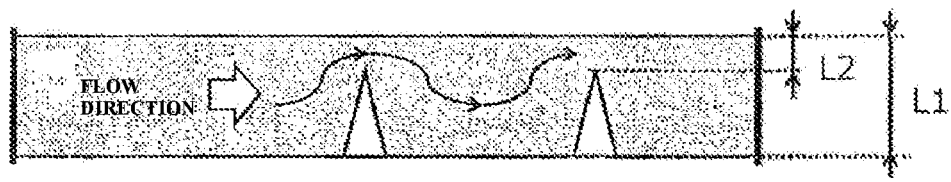

THERMOPLASTIC ELASTOMER COMPOSITION AND THERMOPLASTIC ELASTOMER MOLDED BODY

CROSS-REFERENCE TO RELATED APPLICATIONS

The present application claims priority under 37 U.S.C. § 371 to International Patent Application No. PCT/JP2020/023719, filed Jun. 17, 2020, which claims priority to and the benefit of Japanese Patent Application No. 2019-115407, filed on Jun. 21, 2019. The contents of these applications are hereby incorporated by reference in their entireties.

TECHNICAL FIELD

The present invention relates to a thermoplastic elastomer composition and a thermoplastic elastomer molded body, and specifically relates to a thermoplastic elastomer composition and a thermoplastic elastomer molded body that have excellent low-temperature impact resistance and can suppress luster feeling.

BACKGROUND ART

Olefin thermoplastic elastomers are widely used for example in automotive parts, industrial machinery parts, electronic and electric equipment parts, building materials, as energy-saving and resource-saving type elastomers, particularly alternatives to vulcanized rubbers.

Olefin thermoplastic elastomers, since containing an ethylene/propylene/non-conjugated polyene copolymer (EPDM) and a crystalline polyolefin such as polypropylene as raw materials, have lighter specific gravity and more excellent durability such as heat aging resistance and weather resistance than other thermoplastic elastomers.

Patent Literature 1 discloses a thermoplastic elastomer composition containing a crystalline polyolefin resin, an ethylene/α-olefin copolymer rubber, and an olefin rubber, and discloses that a molded body having more excellent tensile properties such as tensile strength and elongation at break than conventional vulcanized rubbers can be produced from this composition.

Patent Literature 2 discloses a composite elastomer composition obtained by cross-linking an ethylene/α-olefin copolymer containing ethylene and an α-olefin having 3 to 5 carbon atoms, an ethylene/α-olefin copolymer containing ethylene and an α-olefin having 4 to 20 carbon atoms, and an olefin resin, and discloses that this composition has excellent appearance, color tone, flexibility (tactile sensation), oil resistance, mechanical strength, and melt processability.

Patent Literature 3 discloses a cross-linked thermoplastic elastomer composition that includes an ethylene/α-olefin copolymer including an ethylene unit and an α-olefin unit having 3 to 20 carbon atoms; a copolymer having at least one hydrogenated copolymer block mainly composed of a conjugated diene monomer unit and a vinyl aromatic monomer unit; a hydrogenated product of a block copolymer having at least one conjugated diene monomer unit block and at least one vinyl aromatic monomer unit block; and an olefin resin; and discloses that this composition has excellent flexibility, mechanical properties, scratch resistance, abrasion resistance, and low-temperature properties.

Olefin thermoplastic elastomers have excellent natures as described above, but further improvements are desired in some applications. For example, in automotive parts such as airbag covers, high bending elasticity and low-temperature impact resistance are desired. The airbag cover has a thick part and a thin part called a tear part (tear line) and the luster feeling of the tear line tends to be higher than that of the thick part, in unpainted airbag covers, and this is not preferable in terms of appearance.

Patent Literature 4 discloses a thermoplastic elastomer composition for airbag cover including a propylene polymer component and an ethylene-α-olefin copolymer component, an ethylene-α-olefin-non-conjugated diene copolymer rubber, and a mineral oil softener, and discloses that this composition has excellent appearance, fluidity, and mechanical strength.

CITATION LIST

Patent Literature

Patent Literature 1: Japanese Patent Laid-Open No. 9-137001
Patent Literature 2: Japanese Patent Laid-Open No. 2002-146131
Patent Literature 3: WO 2010/067564
Patent Literature 4: Japanese Patent Laid-Open No. 2012-224837

SUMMARY OF INVENTION

Technical Problem

However, it has been found that, also for the conventional thermoplastic elastomer compositions, further improvement in low-temperature impact resistance is desired, and realization of further good appearance by strong suppression on the luster feeling of the tear line is also desired.

An object of the present invention is to provide a thermoplastic elastomer composition having excellent bending elasticity, low-temperature impact resistance, and appearance, and in particular, to provide a thermoplastic elastomer composition that can suppress the luster of tear line when molded into an unpainted airbag cover and can obtain good appearance.

Solution to Problem

The present invention relates to, for example, the following items [1] to [9].

[1] A thermoplastic elastomer composition obtained by subjecting the following components: 41 to 70 parts by mass of component (A), 0 to 54 parts by mass of component (B), and 5 to 59 parts by mass of component (C) (provided that the total content of the components (A), (B), and (C) is 100 parts by mass) to dynamic heat treatment in a presence of a cross-linking agent, component (A): a propylene block copolymer having a melt flow rate measured in accordance with ISO1133 at 230° C. and a load of 2.16 kg of 20 g/10 min or more;
component (B): an ethylene/α-olefin/non-conjugated polyene copolymer comprising a structural unit derived from ethylene, a structural unit derived from an α-olefin having 3 to 20 carbon atoms, and a structural unit derived from a non-conjugated polyene; and
component (C): an ethylene/α-olefin copolymer comprising a structural unit derived from ethylene and a structural unit derived from an α-olefin having 4 to 20 carbon atoms and having a melt flow rate measured in accordance with ISO1133 at 190° C. and a load of 2.16 kg of 5 g/10 min or less.

[2] The thermoplastic elastomer composition according to the item [1], wherein a mass ratio of the component (B) to the component (C), ((B)/(C)) is 49/51 to 0/100.

[3] The thermoplastic elastomer composition according to the item [1] or [2], wherein a type D hardness at 5 seconds after contact with a test piece (type D hardness (after 5 seconds)) measured in accordance with JIS K6253 is 35 or more.

[4] A thermoplastic elastomer molded body obtained by molding the thermoplastic elastomer composition according to any of the items [1] to [3].

[5] A thermoplastic elastomer molded body obtained by injection-molding the thermoplastic elastomer composition according to any of the items [1] to [3].

[6] The thermoplastic elastomer molded body according to the item [4] or [5], wherein a ratio of a thickness of a thickest part L1 to a thickness of a thinnest part L2, (L1/L2) in a direction orthogonal to a flow direction of the composition during molding is 2 or more and 50 or less.

[7] An automotive part comprising the thermoplastic elastomer molded body according to any of the items [4] to [6].

[8] The automotive part according to the item [7], wherein the automotive part is an airbag cover.

[9] The automotive part according to the item [7], wherein the automotive part is an unpainted airbag cover.

Advantageous Effects of Invention

The thermoplastic elastomer composition of the present invention has excellent bending elasticity, low-temperature impact resistance, and appearance, and in particular, it can suppress the luster of a tear line when molded into an unpainted airbag cover and can realize good appearance.

BRIEF DESCRIPTION OF DRAWING

The FIGURE is an explanatory diagram showing a molded body provided with the thickest part having a thickness L1 and the thinnest part having a thickness L2 in the direction orthogonal to the flow direction of a composition during molding.

DESCRIPTION OF EMBODIMENTS

The thermoplastic elastomer composition of the present invention is a thermoplastic elastomer composition obtained by subjecting the following component (A), component (B), and component (C), or the component (A) and the component (C) to dynamic heat treatment in the presence of a cross-linking agent. In the thermoplastic elastomer composition of the present invention, the component (B) is an optional component, and the component (B) may be used or not used.

The component (A) is a propylene block copolymer. The component (A) is, for example, a block copolymer of propylene and other α-olefins, preferably a block copolymer of propylene and 30 mol % or less of other α-olefins, and more preferably a block copolymer of propylene and 15 mol % or less of other α-olefins.

Examples of the other α-olefins include ethylene, 1-butene, 1-pentene, and 1-hexene. Among these, ethylene is particularly preferable.

The component (A) has a melt flow rate measured in accordance with ISO1133 at 230° C. and a load of 2.16 kg of 20 g/10 min or more, preferably 30 to 70 g/10 min, and more preferably 40 to 70 g/10 min. When the melt flow rate is 20 g/10 min or more, a molded body having an excellent balance between moldability and low-temperature impact resistance can be obtained. When the melt flow rate is lower than 20 g/10 min, moldability is deteriorated. When the melt flow rate is 70 g/10 min or less, low-temperature impact resistance becomes higher.

As the propylene block copolymer as described above, for example, J709QG of Prime Polymer Co., Ltd. and BC05B of Japan Polypropylene Corporation are preferably used.

These copolymers may be used singly or in combination of two or more.

The component (B) is an ethylene/α-olefin/non-conjugated polyene copolymer including a structural unit derived from ethylene, a structural unit derived from an α-olefin having 3 to 20 carbon atoms, and a structural unit derived from a non-conjugated polyene.

Examples of the α-olefin having 3 to 20 carbon atoms include propylene, 1-butene, 1-pentene, 3-methyl-1-butene, 1-hexene, 3-methyl-1-pentene, 4-methyl-1-pentene, and 1-octene. Among these, propylene is particularly preferable.

Examples of the non-conjugated polyene include chain non-conjugated dienes such as 1,4-hexadiene, 1,6-octadiene, 2-methyl-1,5-hexadiene, 6-methyl-1,5-heptadiene, and 7-methyl-1,6-octadiene; cyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene, and 6-chloromethyl-5-isopropenyl-2-norbornene; and trienes such as 2,3-diisopropylidene-5-norbornene, 2-ethylidene-3-isopropylidene-5-norbornene, 2-propenyl-2,2-norbornadiene, 1,3,7-octatriene, and 1,4,9-decatriene. Among these, 5-ethylidene-2-norbornene is particularly preferable.

The iodine value of the ethylene/α-olefin/non-conjugated polyene copolymer is preferably 25 or less. The Mooney viscosity [$ML_{1+4}$ (125° C.)] of the ethylene/α-olefin/non-conjugated polyene copolymer is, for example, 10 to 250, and preferably 30 to 150. The mole ratio of the structural unit derived from ethylene to the structural unit derived from an α-olefin having 3 to 20 carbon atoms included in the ethylene/α-olefin/non-conjugated polyene copolymer (ethylene/α-olefin) is preferably 95/5 to 50/50.

The component (C) is an ethylene/α-olefin copolymer including a structural unit derived from ethylene and a structural unit derived from an α-olefin having 4 to 20 carbon atoms.

Examples of the α-olefin having 4 to 20 carbon atoms include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, and 12-ethyl-1-tetradecene. Among these, 1-octene is particularly preferable.

The content ratio of the unit derived from ethylene in the ethylene/α-olefin copolymer is preferably 60 to 95 mol %, and more preferably 70 to 90 mol %. The content ratio of the unit derived from ethylene within the range is preferable to obtain a thermoplastic elastomer composition having excellent low-temperature impact resistance.

The component (C) has a melt flow rate measured in accordance with ISO1133 at 190° C. and a load of 2.16 kg of 5 g/10 min or less, preferably 0.5 to 3.0 g/10 min, and more preferably 0.5 to 1.0 g/10 min. When the melt flow rate is 5 g/10 min or less, cross-linkability during dynamic cross-linking becomes better.

In the component (C), the density measured in accordance with ISO 1183-1 is, for example, 0.856 to 0.870 kg/m$^3$, preferably 0.856 to 0.868 kg/m$^3$, more preferably 0.856 to 0.863 kg/m$^3$, and further preferably 0.856 to 0.861 kg/m$^3$. When the density falls within the above range, low-temperature performance becomes better.

In the component (C), the Mooney viscosity [$ML_{1+4}$ (121° C.)] measured in accordance with ASTM D1646 is, for example, 1 to 100, and preferably 10 to 50. When the Mooney viscosity falls within the above range, low-temperature performance becomes better.

The thermoplastic elastomer composition of the present invention can be obtained by subjecting the component (A), the component (B), and the component (C), or the component (A) and the component (C) to dynamic heat treatment in the presence of a cross-linking agent.

The content ratio of the component (A), the component (B), and the component (C) in this heat treatment is 41 to 70 parts by mass of the component (A), 0 to 54 parts by mass of the component (B), and 5 to 59 parts by mass of the component (C), preferably 50 to 65 parts by mass of the component (A), 0 to 30 parts by mass of the component (B), and 15 to 50 parts by mass of the component (C), and more preferably 50 to 60 parts by mass of the component (A), 5 to 15 parts by mass of the component (B), and 20 to 50 parts by mass of the component (C), relative to 100 parts by mass in total of the components (A), (B), and (C).

The mass ratio of the component (B) to the component (C), ((B)/(C)) is preferably 49/51 to 0/100, and more preferably 40/60 to 20/80.

In the heat treatment, components such as other resins may be used in addition to the component (A), the component (B), and the component (C), within a range not impairing the effects of the present invention.

The thermoplastic elastomer composition of the present invention may contain a plasticizer (softener) (D). As the plasticizer (D), a plasticizer usually used in rubbers can be used, and specific examples thereof include petroleum plasticizers such as process oil, lubricating oil, paraffin, liquid paraffin, petroleum asphalt, and vaseline; coal tar plasticizers such as coal tar and coal tar pitch; fatty oil plasticizers such as castor oil, linseed oil, rapeseed oil, soybean oil, and coconut oil; waxes such as tall oil, beeswax, carnauba wax, and lanolin; fatty acids or metal salts thereof such as ricinoleic acid, palmitic acid, stearic acid, barium stearate, and calcium stearate; synthetic polymer substances such as petroleum resin, coumarone-indene resin, and atactic polypropylene; ester plasticizers such as dioctyl phthalate, dioctyl adipate, and dioctyl sebacate; and other microcrystalline waxes, rubber substitutes (factices), liquid polybutadienes, modified liquid polybutadienes, and liquid thiocols. Among these, petroleum plasticizers, in particular, a process oil is preferable.

The amount of the plasticizer (D) blended in the thermoplastic elastomer composition of the present invention is preferably 0 parts by mass or more and 30 parts by mass or less, relative to 100 parts by mass in total of the components (A), (B), and (C).

The plasticizer (D) may be oil extended with the component (B) in advance or may be contained in the composition without being added to the component (B). In the present invention, in the case where the component (B) in which the plasticizer (D) is oil extended is used, the amount of the plasticizer (D) is not included in the content of the component (B) in the composition as mentioned above.

In the composition, when components derived from other polymers are included in addition to the component (A), the component (B), the component (C), and the component (D) which is used as necessary, the components derived from other polymers are included in an amount less than 40 parts by mass, for example, 35 parts by mass or less, relative to 100 parts by mass in total of the component (B) and the component (C), in one aspect.

The thermoplastic elastomer composition of the present invention may contain, conventionally known additives such as a heat resistant stabilizer, a weathering stabilizer, an anti-aging agent, an antistatic agent, a filler, a colorant, and a lubricant, as necessary, within a range not impairing the objects of the present invention.

Examples of the cross-linking agent used in the heat treatment include cross-linking agents generally used in cross-linking of rubbers, such as an organic peroxide, a phenol resin, a hydrosilicone compound, an amino resin, a quinone or a derivative thereof, an amine compound, an azo compound, an epoxy compound, and an isocyanate compound. Among these, an organic peroxide is suitable.

Specific examples of organic peroxides include dicumyl peroxide, di-tert-butyl peroxide, 2,5-dimethyl-2,5-di-(tert-butylperoxy) hexane, 2,5-dimethyl-2,5-di-(tert-butylperoxy) hexine-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butylperoxybenzoate, tert-butylperbenzoate, tert-butylperoxyisopropylcarbonate, diacetyl peroxide, lauroyl peroxide, and tert-butyl cumyl peroxide.

Among these, 2,5-dimethyl-2,5-di-(tert-butylperoxy) hexane, 2,5-dimethyl-2,5-di-(tert-butylperoxy)hexine-3, and 1,3-bis(tert-butylperoxyisopropyl)benzene are preferable in terms of odor properties and scorch stability, and above all, 2,5-dimethyl-2,5-di-(tert-butylperoxy)hexine-3 is most preferable.

Such organic peroxides are used in a proportion of usually 0.05 to 3% by mass, and preferably 0.1 to 2% by mass, relative to 100% by mass in total of the components (A), (B), and (C).

In the cross-linking treatment using the above organic peroxides, cross-linking aids such as sulfur, p-quinone dioxime, p,p'-dibenzoylquinone dioxime, N-methyl-N, 4-dinitroso aniline, nitrosobenzene, diphenylguanidine, trimethylol propane, N,N'-m-phenylenedimaleimide, divinylbenzene, triallyl cyanurate, and triallyl isocyanurate; or polyfunctional methacrylate monomers such as ethylene glycol dimethacrylate, diethylene glycol dimethacrylate, polyethylene glycol dimethacrylate, trimethylolpropane trimethacrylate, and allyl methacrylate; or polyfunctional vinyl monomers such as vinylbutyrate and vinyl stearate may be blended.

By using such compounds as described above, a uniform and mild cross-linking reaction can be expected. In particular, in the present invention, divinylbenzene is most preferably used. Divinylbenzene is easily handled, has good compatibility with the components (A) and (B) which are the main components of the above cross-linked product, has a function to solubilize organic peroxides, and acts as a dispersing agent for organic peroxides; and thus, use of divinylbenzene allows obtaining a thermoplastic elastomer composition in which a cross-linking effect by heat treatment is uniform and a balance between fluidity and physical properties is favorable.

The compounds such as cross-linking aids or polyfunctional vinyl monomers as described above are preferably used in a proportion of 0.1 to 3% by mass, in particular, 0.3 to 2% by mass relative to 100% by mass in total of the components (A), (B), and (C).

The above "dynamic heat treatment" refers to kneading of respective components as described above in a molten state. The dynamic heat treatment is performed using a kneading apparatus such as a mixing roll, an intensive mixer (e.g., a Banbury Mixer and a kneader), a single screw or a twin screw extruder, and is preferably performed in a non-open type kneading apparatus. The dynamic heat treatment is preferably performed in an inert gas atmosphere such as nitrogen.

Kneading is desirably performed at a temperature such that the half-life of the organic peroxide to be used is less than 1 minute. The kneading temperature is usually 150 to 280° C., and preferably 170° C. to 240° C. The kneading time is usually 1 to 20 minutes, and preferably 1 to 5 minutes. The shear force applied during kneading is determined within a range of shear rate of usually 10 to 10,000 sec$^{-1}$, and preferably 100 to 10,000 sec$^{-1}$.

In this way, an olefin thermoplastic elastomer composition in which the components (A), (B), and (C), or the components (A) and (C) are cross-linked can be obtained.

The thermoplastic elastomer composition of the present invention has excellent bending elasticity, low-temperature impact resistance, and appearance.

Specifically, the thermoplastic elastomer composition of the present invention preferably has a type D hardness (after 5 seconds) in accordance with JIS K6253 of 35 or more, and more preferably 35 to 60.

By utilizing the performances of the thermoplastic elastomer composition of the present invention described above, various thermoplastic elastomer molded bodies having excellent performances can be obtained from the thermoplastic elastomer composition of the present invention.

Examples of molding method include extrusion, press molding, injection molding, calendering, and blow molding, and among these, injection molding is particularly suitable.

Examples of thermoplastic elastomer molded bodies include automotive parts, civil engineering and building supplies, electrical and electronic parts, hygienic articles, and films and sheets. Among these, automotive parts are particularly preferable because the performances of the thermoplastic elastomer composition of the present invention are suitably exhibited.

Examples of automotive parts include a weatherstrip material, a bumper mall, a side moldings, an air spoiler, an air duct hose, a wire harness grommet, a rack and pinion boot, a suspension cover boot, a glass guide, an inter beltline seal, a corner molding, a glass encapsulation, a hood seal, a glass run channel, a secondary seal, various packings, a hose, and an airbag cover.

The airbag cover has a thick part and a thin part called a tear part (tear line). The tear line is a linear part along which the cover tears upon operation of the airbag. In unpainted airbag covers, the luster feeling of the tear line tends to be highly expressed than that of the thick part, but the luster of the tear line can be suppressed in airbag covers produced from the thermoplastic elastomer composition of the present invention, and thus, the difference in luster feeling between the tear line and the thick part is reduced and the good appearance can be realized. Thus, as the particularly preferred example of the thermoplastic elastomer molded bodies, unpainted airbag covers can be mentioned.

An example of a molded body having a thick part and a thin part is shown in the FIGURE. The direction from the left to the right in the FIGURE is the flow direction of a composition during molding. The curved arrow in the FIGURE represents the flow path of the composition during molding. In a molded body having a thick part and a thin part produced from the thermoplastic elastomer composition of the present invention, the ratio of the thickness of the thickest part L1 to the thickness of the thinnest part L2, (L1/L2) in the direction orthogonal to the flow direction of resin is preferably 2 or more and 50 or less, and more preferably 2 or more and 20 or less. When the ratio (L1/L2) is 2 or more and 50 or less, a molded body with good appearance in which the luster in the thin part is suppressed can be obtained.

EXAMPLES

Hereinafter, the present invention will be described by way of Examples, but the present invention is not limited to these Examples.

The raw materials used in Examples and Comparative Example are described below.

Component A: block polypropylene,
melt flow rate (ISO1133, 230° C., 2.16 kg load): 60 g/10 min, density (ISO1183): 0.91 g/cm$^3$, ethylene unit content: 4% by mass.

Component B: ethylene/propylene/5-ethylidene-2-norbornene copolymer rubber,
ethylene unit content (provided that the total of a structural unit derived from ethylene and a structural unit derived from propylene is 100% by mass): 68% by mass, iodine value: 11, Mooney viscosity [ML$_{1+4}$ (125° C.)]: 51.

In Examples and Comparative Example, an oil extended ethylene/propylene/5-ethylidene-2-norbornene copolymer rubber in which 40 parts by mass of plasticizer (Diana Process Oil PW-380, manufactured by Idemitsu Kosan Co., Ltd.) was blended relative to 100 parts by mass of the component B (hereinafter referred to as oil extended component B) was used as the material including the component B.

Component C: ethylene/1-octene copolymer rubber,
melt flow rate (ISO1133, 190° C., 2.16 kg load): 1 g/10 min, ethylene unit content: 80 mol %, density: 0.861 kg/m$^3$, Mooney viscosity: 25.

Cross-linking agent: organic peroxide (2,5-dimethyl-2,5-di-(tert-butylperoxy)hexine-3, Perhexyne 25B, manufactured by NOF Corporation).

Cross-linking aid: divinylbenzene.

Example 1

With a Henschel mixer, 55.7 parts by mass of the component A, 40.2 parts by mass of the oil extended component B (28.7 parts by mass of the component B), 15.6 parts by mass of the component C, 0.3 parts by mass of the cross-linking agent, and 0.3 parts by mass of the cross-linking aid described above were thoroughly mixed and kneaded under the following conditions to obtain a thermoplastic elastomer composition.

(Kneading Conditions)
Extruder: product number: KTX-46, manufactured by Kobe Steel, Ltd.
Cylinder temperature: C1 to C2: 120° C., C3 to C4: 140° C., C5 to C14: 200° C.

Die temperature: 200° C., screw speed: 400 rpm, extrusion output: 80 kg/h

Examples 2 to 4 and Comparative Example 1

Each thermoplastic elastomer composition was obtained in the same manner as in Example 1 except that the amount of each component blended was changed as shown in Table 1. The oil extended component B was used such that the amount of the component B was the amount described in Table 1.

TABLE 1

| | Raw material | Unit | Example 1 | Example 2 | Example 3 | Example 4 | Comparative Example 1 |
|---|---|---|---|---|---|---|---|
| Raw material blending ratio | Component A | Parts by mass | 55.7 | 52.0 | 55.0 | 55.4 | 59.8 |
| | Component B | Parts by mass | 28.7 | 9.6 | — | 11.2 | 21.7 |
| | Component C | Parts by mass | 15.6 | 38.4 | 45.0 | 33.4 | 18.5 |
| | Cross-linking agent | Parts by mass | 0.3 | 0.3 | 0.1 | 0.1 | — |
| | Cross-linking aid | Parts by mass | 0.3 | 0.3 | 0.1 | 0.1 | — |

Measurements of the following physical properties were performed using each thermoplastic elastomer composition obtained above. The results are shown in Table 2.

The injection-molded plates, test pieces, molded plates, and molded bodies used in the measurements of the following physical properties were prepared using an injection molding machine (NEX140 manufactured by NISSEI PLASTIC INDUSTRIAL CO., LTD.) at a composition temperature of 220° C. from each thermoplastic elastomer composition obtained above.

(1) Melt Flow Rate (MFR)

The melt flow rate was measured in accordance with ISO1133 at 230° C. and a load of 2.16 kg.

(2) Shore D Hardness

The Shore D hardness was measured in accordance with JIS K6253. Injection-molded plates having a thickness of 3 mm were prepared from each thermoplastic elastomer composition, and two pieces of the injection-molded plates were stacked to prepare each laminated sheet having a thickness of 6 mm. The Shore D hardness was measured using these laminated sheets with a Shore D hardness meter. Regarding the Shore D hardness, the value after 5 seconds from the contact with the test piece was determined.

(3) Izod Impact Test

The Izod impact test was performed in accordance with ASTM D256. Each test piece having a thickness of 3.2 mm with a notch for Izod impact strength was prepared by injection molding from each thermoplastic elastomer composition, and the test was performed in an atmosphere of a temperature of −40° C. The Izod impact resistance was evaluated from the breakdown condition of each test piece after test based on the following criteria.

NB: not broken
B: broken (4) Gloss

The gloss was measured in accordance with ISO 7668. Each molded plate with a mirror surface was prepared from each thermoplastic elastomer composition by injection molding, and the gloss was measured at an incidence angle of 60°.

(5) Appearance

Each molded body having a thick part in which L1 is 3 mm and a thin part in which L2 is 0.5 mm, as shown in the FIGURE, was prepared from each thermoplastic elastomer composition by injection molding. The change of gloss occurring on the tear line part that appeared on the thin part of the molded body was visually observed, and the appearance was evaluated with respect to the difference in gloss between the thick part and the tear line part based on the following criteria. Evaluation of appearance was performed by 3 panelists and the evaluation results were unanimous.

3: Difference in gloss between thick part and tear line part is not confirmed.
2: Difference in gloss between thick part and tear line part is slightly confirmed.
1: Difference in gloss between thick part and tear line part is clearly confirmed.

TABLE 2

| | Unit | Example 1 | Example 2 | Example 3 | Example 4 | Comparative Example 1 |
|---|---|---|---|---|---|---|
| MFR | g/10 min | 2 | 1 | 9 | 6 | 13 |
| Hardness (Shore D) | — | 42 | 42 | 42 | 42 | 44 |
| Izod impact test | — | NB | NB | NB | NB | B |
| Gloss | — | 8 | 8 | 8 | 7 | 13 |
| Appearance | — | 2 | 3 | 3 | 3 | 1 |

The invention claimed is:

1. A thermoplastic elastomer composition obtained by subjecting following components: 41 to 70 parts by mass of component (A), 5 to 54 parts by mass of component (B), and 5 to 50 parts by mass of component (C), provided that the total content of the components (A), (B), and (C) is 100 parts by mass, and wherein a mass ratio of the component (B) to the component (C), ((B)/(C)) is 49/51 to 20/80, to dynamic heat treatment in a presence of a cross-linking agent,
   component (A): a propylene block copolymer having a melt flow rate measured in accordance with ISO1133 at 230° C. and a load of 2.16 kg of 20 g/10 min or more;
   component (B): an ethylene/propylene/non-conjugated polyene copolymer comprising a structural unit derived from ethylene, a structural unit derived from propylene, and a structural unit derived from a non-conjugated polyene; and
   component (C): an ethylene/α-olefin copolymer comprising a structural unit derived from ethylene and a structural unit derived from an α-olefin having 4 to 20 carbon atoms and having a melt flow rate measured in accordance with ISO1133 at 190° C. and a load of 2.16 kg of 5 g/10 min or less.

2. The thermoplastic elastomer composition according to claim 1, wherein a type D hardness at 5 seconds after contact with a test piece (type D hardness (after 5 seconds)) measured in accordance with JIS K6253 is 35 or more.

3. A thermoplastic elastomer molded body obtained by molding the thermoplastic elastomer composition according to claim 1.

4. A thermoplastic elastomer molded body obtained by injection-molding the thermoplastic elastomer composition according to claim 1.

5. The thermoplastic elastomer molded body according to claim 3, wherein a ratio of a thickness of a thickest part L1 to a thickness of a thinnest part L2, (L1/L2) in a direction orthogonal to a flow direction of the composition during molding is 2 or more and 50 or less.

6. An automotive part comprising the thermoplastic elastomer molded body according to claim 3.

7. The automotive part according to claim 6, wherein the automotive part is an airbag cover.

8. The automotive part according to claim 6, wherein the automotive part is an unpainted airbag cover.

* * * * *